«12» United States Patent
Bennin et al.

(10) Patent No.: US 9,245,555 B2
(45) Date of Patent: Jan. 26, 2016

(54) LOW RESISTANCE GROUND JOINTS FOR DUAL STAGE ACTUATION DISK DRIVE SUSPENSIONS

(71) Applicant: Hutchinson Technology Incorporated, Hutchinson, MN (US)

(72) Inventors: Jeffry S. Bennin, Hutchinson, MN (US); Jacob D. Bjorstrom, Hutchinson, MN (US); Shawn P. Bopp, Savage, MN (US); Reed T. Hentges, Buffalo, MN (US); Michael T. Hofflander, Edina, MN (US); Richard R. Jenneke, Hutchinson, MN (US); Craig A. Leabch, St. Cloud, MN (US); Mark S. Lewandowski, Hutchinson, MN (US); Zachary A. Pokornowski, Cokato, MN (US); Brian D. Schafer, Mound, MN (US); Brian J. Stepien, Glencoe, MN (US); John A. Theget, Hutchinson, MN (US); John E. Theisen, Winsted, MN (US); John L. Wagner, Plymouth, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 14/531,571

(22) Filed: Nov. 3, 2014

(65) Prior Publication Data

US 2015/0055255 A1    Feb. 26, 2015

Related U.S. Application Data

(63) Continuation of application No. 13/114,212, filed on May 24, 2011, now Pat. No. 8,885,299.

(60) Provisional application No. 61/396,239, filed on May 24, 2010.

(51) Int. Cl.
*G11B 21/16* (2006.01)
*G11B 5/48* (2006.01)

(52) U.S. Cl.
CPC ........... *G11B 5/4873* (2013.01); *G11B 5/4833* (2013.01)

(58) Field of Classification Search
CPC ............... Y10T 29/49025; H05K 2201/0394; G11B 5/486; G11B 5/4853; G11B 5/4856; G11B 5/484; G11B 5/4806; G11B 5/48; G11B 33/08; G11B 33/54833
USPC ..................... 360/294.4, 294.3, 245.8, 245.9
See application file for complete search history.

(56) References Cited

U.S. PATENT DOCUMENTS 3,320,556 A    5/1967   Schneider
4,168,214 A    9/1979   Fletcher et al.
(Continued)

FOREIGN PATENT DOCUMENTS

EP    0591954 B1    4/1994
EP    0834867 B1    5/2007
(Continued)

OTHER PUBLICATIONS

International Search Report and Written Opinion issued in PCT/US2013/059702, dated Mar. 28, 2014, 9 pages.
(Continued)

*Primary Examiner* — Julie Anne Watko
(74) *Attorney, Agent, or Firm* — Faegre Baker Daniels LLP (57) ABSTRACT

Stable, low resistance conductive adhesive ground connections between motor contacts and a gold-plated contact area on a stainless steel component of a dual stage actuated suspension. The stainless steel component can be a baseplate, load beam, hinge, motor plate, add-on feature or flexure.

20 Claims, 10 Drawing Sheets

(56) References Cited

U.S. PATENT DOCUMENTS

| | | |
|---|---|---|
| 4,418,239 A | 11/1983 | Larson et al. |
| 4,422,906 A | 12/1983 | Kobayashi |
| 4,659,438 A | 4/1987 | Kuhn et al. |
| 5,140,288 A | 8/1992 | Grunwell |
| 5,320,272 A | 6/1994 | Melton et al. |
| 5,321,568 A | 6/1994 | Hatam-Tabrizi |
| 5,333,085 A | 7/1994 | Prentice et al. |
| 5,427,848 A | 6/1995 | Baer et al. |
| 5,459,921 A | 10/1995 | Hudson et al. |
| 5,485,053 A | 1/1996 | Baz |
| 5,491,597 A | 2/1996 | Bennin et al. |
| 5,521,778 A | 5/1996 | Boutaghou et al. |
| 5,598,307 A | 1/1997 | Bennin |
| 5,608,590 A | 3/1997 | Ziegler et al. |
| 5,608,591 A | 3/1997 | Klaassen |
| 5,631,786 A | 5/1997 | Erpelding |
| 5,636,089 A | 6/1997 | Jurgenson et al. |
| 5,651,723 A | 7/1997 | Bjornard et al. |
| 5,657,186 A | 8/1997 | Kudo et al. |
| 5,657,188 A | 8/1997 | Jurgenson et al. |
| 5,666,241 A | 9/1997 | Summers |
| 5,666,717 A | 9/1997 | Matsumoto et al. |
| 5,694,270 A | 12/1997 | Sone et al. |
| 5,717,547 A | 2/1998 | Young |
| 5,734,526 A | 3/1998 | Symons |
| 5,737,152 A | 4/1998 | Balakrishnan |
| 5,754,368 A | 5/1998 | Shiraishi et al. |
| 5,764,444 A | 6/1998 | Imamura et al. |
| 5,773,889 A | 6/1998 | Love et al. |
| 5,790,347 A | 8/1998 | Girard |
| 5,796,552 A | 8/1998 | Akin, Jr. et al. |
| 5,805,382 A | 9/1998 | Lee et al. |
| 5,812,344 A | 9/1998 | Balakrishnan |
| 5,818,662 A | 10/1998 | Shum |
| 5,857,257 A | 1/1999 | Inaba |
| 5,862,010 A | 1/1999 | Simmons et al. |
| 5,889,137 A | 3/1999 | Hutchings et al. |
| 5,892,637 A | 4/1999 | Brooks, Jr. et al. |
| 5,898,544 A | 4/1999 | Krinke et al. |
| 5,914,834 A | 6/1999 | Gustafson |
| 5,921,131 A | 7/1999 | Stange |
| 5,924,187 A | 7/1999 | Matz |
| 5,973,882 A | 10/1999 | Tangren |
| 5,973,884 A | 10/1999 | Hagen |
| 5,986,853 A | 11/1999 | Simmons et al. |
| 5,995,328 A | 11/1999 | Balakrishnan |
| 5,995,329 A | 11/1999 | Shiraishi et al. |
| 6,011,671 A | 1/2000 | Masse et al. |
| 6,038,102 A | 3/2000 | Balakrishnan et al. |
| 6,046,887 A | 4/2000 | Uozumi et al. |
| 6,055,132 A | 4/2000 | Arya et al. |
| 6,075,676 A | 6/2000 | Hiraoka et al. |
| 6,078,470 A | 6/2000 | Danielson et al. |
| 6,108,175 A | 8/2000 | Hawwa et al. |
| 6,118,637 A | 9/2000 | Wright et al. |
| 6,144,531 A | 11/2000 | Sawai |
| 6,146,813 A | 11/2000 | Girard et al. |
| 6,156,982 A | 12/2000 | Dawson |
| 6,157,522 A | 12/2000 | Murphy et al. |
| 6,172,853 B1 | 1/2001 | Davis et al. |
| 6,195,227 B1 | 2/2001 | Fan et al. |
| 6,215,622 B1 | 4/2001 | Ruiz et al. |
| 6,229,673 B1 | 5/2001 | Shinohara et al. |
| 6,233,124 B1 | 5/2001 | Budde et al. |
| 6,239,953 B1 | 5/2001 | Mei |
| 6,246,546 B1 | 6/2001 | Tangren |
| 6,246,552 B1 | 6/2001 | Soeno et al. |
| 6,249,404 B1 | 6/2001 | Doundakov et al. |
| 6,262,868 B1 | 7/2001 | Arya et al. |
| 6,275,358 B1 | 8/2001 | Balakrishnan et al. |
| 6,278,587 B1 | 8/2001 | Mei |
| 6,282,062 B1 | 8/2001 | Shiraishi |
| 6,295,185 B1 | 9/2001 | Stefansky |
| 6,297,936 B1 | 10/2001 | Kant et al. |
| 6,300,846 B1 | 10/2001 | Brunker |
| 6,307,715 B1 | 10/2001 | Berding et al. |
| 6,320,730 B1 | 11/2001 | Stefansky et al. |
| 6,330,132 B1 | 12/2001 | Honda |
| 6,349,017 B1 | 2/2002 | Schott |
| 6,376,964 B1 | 4/2002 | Young et al. |
| 6,396,667 B1 | 5/2002 | Zhang et al. |
| 6,399,899 B1 | 6/2002 | Ohkawa et al. |
| 6,400,532 B1 | 6/2002 | Mei |
| 6,404,594 B1 | 6/2002 | Maruyama et al. |
| 6,424,500 B1 | 7/2002 | Coon et al. |
| 6,445,546 B1 | 9/2002 | Coon |
| 6,459,549 B1 | 10/2002 | Tsuchiya et al. |
| 6,480,359 B1 | 11/2002 | Dunn et al. |
| 6,490,228 B2 | 12/2002 | Killam |
| 6,493,190 B1 | 12/2002 | Coon |
| 6,493,192 B2 | 12/2002 | Crane et al. |
| 6,539,609 B2 | 4/2003 | Palmer et al. |
| 6,549,376 B1 | 4/2003 | Scura et al. |
| 6,549,736 B2 | 4/2003 | Miyabe et al. |
| 6,563,676 B1 | 5/2003 | Chew et al. |
| 6,596,184 B1 | 7/2003 | Shum et al. |
| 6,597,541 B2 | 7/2003 | Nishida et al. |
| 6,600,631 B1 | 7/2003 | Berding et al. |
| 6,621,653 B1 | 9/2003 | Schirle |
| 6,621,658 B1 | 9/2003 | Nashif |
| 6,636,388 B2 | 10/2003 | Stefansky |
| 6,639,761 B1 | 10/2003 | Boutaghou et al. |
| 6,647,621 B1 | 11/2003 | Roen et al. |
| 6,661,617 B1 | 12/2003 | Hipwell, Jr. et al. |
| 6,661,618 B2 | 12/2003 | Fujiwara et al. |
| 6,704,157 B2 | 3/2004 | Himes et al. |
| 6,704,158 B2 | 3/2004 | Hawwa et al. |
| 6,704,165 B2 | 3/2004 | Kube et al. |
| 6,714,384 B2 | 3/2004 | Himes et al. |
| 6,714,385 B1 | 3/2004 | Even et al. |
| 6,728,057 B2 | 4/2004 | Putnam |
| 6,728,077 B1 | 4/2004 | Murphy |
| 6,731,472 B2 | 5/2004 | Okamoto et al. |
| 6,735,052 B2 | 5/2004 | Dunn et al. |
| 6,735,055 B1 | 5/2004 | Crane et al. |
| 6,737,931 B2 | 5/2004 | Amparan et al. |
| 6,738,225 B1 | 5/2004 | Summers et al. |
| 6,741,424 B1 | 5/2004 | Danielson et al. |
| 6,751,062 B2 | 6/2004 | Kasajima et al. |
| 6,760,182 B2 | 7/2004 | Bement et al. |
| 6,760,194 B2 | 7/2004 | Shiraishi et al. |
| 6,760,196 B1 | 7/2004 | Niu et al. |
| 6,762,913 B1 | 7/2004 | Even et al. |
| 6,765,761 B2 | 7/2004 | Arya |
| 6,771,466 B2 | 8/2004 | Kasajima et al. |
| 6,771,467 B2 | 8/2004 | Kasajima et al. |
| 6,791,802 B2 | 9/2004 | Watanabe et al. |
| 6,797,888 B2 | 9/2004 | Ookawa et al. |
| 6,798,597 B1 | 9/2004 | Aram et al. |
| 6,801,402 B1 | 10/2004 | Subrahmanyam et al. |
| 6,831,539 B1 | 12/2004 | Hipwell, Jr. et al. |
| 6,833,978 B2 | 12/2004 | Shum et al. |
| 6,839,204 B2 | 1/2005 | Shiraishi et al. |
| 6,841,737 B2 | 1/2005 | Komatsubara et al. |
| 6,856,075 B1 | 2/2005 | Houk et al. |
| 6,882,506 B2 | 4/2005 | Yamaoka et al. |
| 6,891,700 B2 | 5/2005 | Shiraishi et al. |
| 6,898,042 B2 | 5/2005 | Subrahmanyan |
| 6,900,967 B1 | 5/2005 | Coon et al. |
| 6,922,305 B2 | 7/2005 | Price |
| 6,934,127 B2 | 8/2005 | Yao et al. |
| 6,942,817 B2 | 9/2005 | Yagi et al. |
| 6,943,991 B2 | 9/2005 | Yao et al. |
| 6,950,288 B2 | 9/2005 | Yao et al. |
| 6,963,471 B2 | 11/2005 | Arai et al. |
| 6,975,488 B1 | 12/2005 | Kulangara et al. |
| 6,977,790 B1 | 12/2005 | Chen et al. |
| 7,006,333 B1 | 2/2006 | Summers |
| 7,016,159 B1 | 3/2006 | Bjorstrom et al. |
| 7,020,949 B2 | 4/2006 | Muramatsu et al. |
| 7,023,667 B2 | 4/2006 | Shum |
| 7,050,267 B2 | 5/2006 | Koh et al. |
| 7,057,857 B1 | 6/2006 | Niu et al. |
| 7,064,928 B2 | 6/2006 | Fu et al. |

(56) References Cited

U.S. PATENT DOCUMENTS

| | | |
|---|---|---|
| 7,079,357 B1 | 7/2006 | Kulangara et al. |
| 7,082,670 B2 | 8/2006 | Boismier et al. |
| 7,092,215 B2 | 8/2006 | Someya et al. |
| 7,099,117 B1 | 8/2006 | Subrahmanyam et al. |
| 7,129,418 B2 | 10/2006 | Aonuma et al. |
| 7,130,159 B2 | 10/2006 | Shimizu et al. |
| 7,132,607 B2 | 11/2006 | Yoshimi et al. |
| 7,142,395 B2 | 11/2006 | Swanson et al. |
| 7,144,687 B2 | 12/2006 | Fujisaki et al. |
| 7,158,348 B2 | 1/2007 | Erpelding et al. |
| 7,159,300 B2 | 1/2007 | Yao et al. |
| 7,161,767 B2 | 1/2007 | Hernandez et al. |
| 7,177,119 B1 | 2/2007 | Bennin et al. |
| 7,218,481 B1 | 5/2007 | Bennin et al. |
| 7,256,968 B1 | 8/2007 | Krinke |
| 7,271,958 B2 | 9/2007 | Yoon et al. |
| 7,292,413 B1 | 11/2007 | Coon |
| 7,307,817 B1 | 12/2007 | Mei |
| 7,322,241 B2 | 1/2008 | Kai |
| 7,336,436 B2 | 2/2008 | Sharma et al. |
| 7,342,750 B2 | 3/2008 | Yang et al. |
| 7,345,851 B2 | 3/2008 | Hirano et al. |
| 7,375,930 B2 | 5/2008 | Yang et al. |
| 7,379,274 B2 | 5/2008 | Yao et al. |
| 7,382,582 B1 | 6/2008 | Cuevas |
| 7,384,531 B1 | 6/2008 | Peltoma et al. |
| 7,385,788 B2 | 6/2008 | Kubota et al. |
| 7,388,733 B2 | 6/2008 | Swanson et al. |
| 7,391,594 B2 | 6/2008 | Fu et al. |
| 7,403,357 B1 | 7/2008 | Williams |
| 7,408,745 B2 | 8/2008 | Yao et al. |
| 7,417,830 B1 | 8/2008 | Kulangara |
| 7,420,778 B2 | 9/2008 | Sassine et al. |
| 7,459,835 B1 | 12/2008 | Mei et al. |
| 7,460,337 B1 | 12/2008 | Mei |
| 7,466,520 B2 | 12/2008 | White et al. |
| 7,499,246 B2 | 3/2009 | Nakagawa |
| 7,509,859 B2 | 3/2009 | Kai |
| 7,518,830 B1 | 4/2009 | Panchal et al. |
| 7,567,410 B1 | 7/2009 | Zhang et al. |
| 7,595,965 B1 | 9/2009 | Kulangara et al. |
| 7,625,654 B2 | 12/2009 | Vyas et al. |
| 7,629,539 B2 | 12/2009 | Ishii et al. |
| 7,643,252 B2 | 1/2010 | Arai et al. |
| 7,649,254 B2 | 1/2010 | Graydon et al. |
| 7,663,841 B2 | 2/2010 | Budde et al. |
| 7,667,921 B2 | 2/2010 | Satoh et al. |
| 7,675,713 B2 | 3/2010 | Ogawa et al. |
| 7,688,552 B2 | 3/2010 | Yao et al. |
| 7,692,899 B2 | 4/2010 | Arai et al. |
| 7,697,237 B1 | 4/2010 | Danielson |
| 7,701,673 B2 | 4/2010 | Wang et al. |
| 7,701,674 B2 | 4/2010 | Arai |
| 7,710,687 B1 | 5/2010 | Carlson et al. |
| 7,710,688 B1 | 5/2010 | Hentges et al. |
| 7,719,798 B2 | 5/2010 | Yao |
| 7,724,478 B2 | 5/2010 | Deguchi et al. |
| 7,751,153 B1 | 7/2010 | Kulangara et al. |
| 7,768,746 B2 | 8/2010 | Yao et al. |
| 7,782,572 B2 | 8/2010 | Pro |
| 7,804,663 B2 | 9/2010 | Hirano et al. |
| 7,813,084 B1 | 10/2010 | Hentges |
| 7,821,742 B1 | 10/2010 | Mei |
| 7,826,177 B1 | 11/2010 | Zhang et al. |
| 7,832,082 B1 | 11/2010 | Hentges et al. |
| 7,835,113 B1 | 11/2010 | Douglas |
| 7,872,344 B2 | 1/2011 | Fjelstad et al. |
| 7,875,804 B1 | 1/2011 | Tronnes et al. |
| 7,914,926 B2 | 3/2011 | Kimura et al. |
| 7,923,644 B2 | 4/2011 | Ishii et al. |
| 7,924,530 B1 | 4/2011 | Chocholaty |
| 7,929,252 B1 | 4/2011 | Hentges et al. |
| 7,983,008 B2 | 7/2011 | Liao et al. |
| 7,986,494 B2 | 7/2011 | Pro |
| 8,004,798 B1 | 8/2011 | Dunn |
| 8,085,508 B2 | 12/2011 | Hatch |
| 8,089,728 B2 | 1/2012 | Yao et al. |
| 8,120,878 B1 | 2/2012 | Drape et al. |
| 8,125,736 B2 | 2/2012 | Nojima et al. |
| 8,125,741 B2 | 2/2012 | Shelor |
| 8,144,430 B2 | 3/2012 | Hentges et al. |
| 8,144,436 B2 | 3/2012 | Iriuchijima et al. |
| 8,149,542 B2 | 4/2012 | Ando et al. |
| 8,151,440 B2 | 4/2012 | Tsutsumi et al. |
| 8,161,626 B2 | 4/2012 | Ikeji |
| 8,169,746 B1 | 5/2012 | Rice et al. |
| 8,174,797 B2 | 5/2012 | Iriuchijima |
| 8,189,301 B2 | 5/2012 | Schreiber |
| 8,194,359 B2 | 6/2012 | Yao et al. |
| 8,199,441 B2 | 6/2012 | Nojima |
| 8,228,642 B1 | 7/2012 | Hahn et al. |
| 8,248,731 B2 | 8/2012 | Fuchino |
| 8,248,734 B2 | 8/2012 | Fuchino |
| 8,248,735 B2 | 8/2012 | Fujimoto et al. |
| 8,248,736 B2 | 8/2012 | Hanya et al. |
| 8,254,062 B2 | 8/2012 | Greminger |
| 8,259,416 B1 | 9/2012 | Davis et al. |
| 8,264,797 B2 | 9/2012 | Emley |
| 8,289,652 B2 | 10/2012 | Zambri et al. |
| 8,295,012 B1 | 10/2012 | Tian et al. |
| 8,296,929 B2 | 10/2012 | Hentges et al. |
| 8,300,362 B2 | 10/2012 | Virmani et al. |
| 8,310,790 B1 | 11/2012 | Fanslau, Jr. |
| 8,331,061 B2 | 12/2012 | Hanya et al. |
| 8,339,748 B2 | 12/2012 | Shum et al. |
| 8,351,160 B2 | 1/2013 | Fujimoto |
| 8,363,361 B2 | 1/2013 | Hanya et al. |
| 8,379,349 B1 | 2/2013 | Pro et al. |
| 8,446,694 B1 | 5/2013 | Tian et al. |
| 8,456,780 B1 | 6/2013 | Ruiz |
| 8,498,082 B1 | 7/2013 | Padeski et al. |
| 8,526,142 B1 | 9/2013 | Dejkoonmak et al. |
| 8,542,465 B2 | 9/2013 | Liu et al. |
| 8,553,364 B1 | 10/2013 | Schreiber et al. |
| 8,559,137 B2 | 10/2013 | Imuta |
| 8,634,166 B2 | 1/2014 | Ohnuki et al. |
| 8,665,565 B2 | 3/2014 | Pro et al. |
| 8,675,314 B1 | 3/2014 | Bjorstrom et al. |
| 8,681,456 B1 | 3/2014 | Miller et al. |
| 2001/0012181 A1 | 8/2001 | Inoue et al. |
| 2001/0013993 A1 | 8/2001 | Coon |
| 2001/0030838 A1 | 10/2001 | Takadera et al. |
| 2001/0043443 A1 | 11/2001 | Okamoto et al. |
| 2002/0075606 A1 | 6/2002 | Nishida et al. |
| 2002/0118492 A1 | 8/2002 | Watanabe et al. |
| 2002/0149888 A1 | 10/2002 | Motonishi et al. |
| 2003/0011118 A1 | 1/2003 | Kasajima et al. |
| 2003/0011936 A1 | 1/2003 | Himes et al. |
| 2003/0053258 A1 | 3/2003 | Dunn et al. |
| 2003/0089520 A1 | 5/2003 | Ooyabu et al. |
| 2003/0135985 A1 | 7/2003 | Yao et al. |
| 2003/0174445 A1 | 9/2003 | Luo |
| 2003/0202293 A1 | 10/2003 | Nakamura et al. |
| 2003/0210499 A1 | 11/2003 | Arya |
| 2004/0027727 A1 | 2/2004 | Shimizu et al. |
| 2004/0027728 A1 | 2/2004 | Coffey et al. |
| 2004/0070884 A1 | 4/2004 | Someya et al. |
| 2004/0125508 A1 | 7/2004 | Yang et al. |
| 2004/0181932 A1 | 9/2004 | Yao et al. |
| 2004/0207957 A1 | 10/2004 | Kasajima et al. |
| 2004/0221447 A1 | 11/2004 | Ishii et al. |
| 2004/0264056 A1 | 12/2004 | Jang et al. |
| 2005/0061542 A1 | 3/2005 | Aonuma et al. |
| 2005/0063097 A1 | 3/2005 | Maruyama et al. |
| 2005/0105217 A1 | 5/2005 | Kwon et al. |
| 2005/0117257 A1 | 6/2005 | Thaveeprungsriporn et al. |
| 2005/0254175 A1 | 11/2005 | Swanson et al. |
| 2005/0280944 A1 | 12/2005 | Yang et al. |
| 2006/0044698 A1 | 3/2006 | Hirano et al. |
| 2006/0077594 A1 | 4/2006 | White et al. |
| 2006/0181812 A1 | 8/2006 | Kwon et al. |
| 2006/0193086 A1 | 8/2006 | Zhu et al. |
| 2006/0209465 A1 | 9/2006 | Takikawa et al. |
| 2006/0238924 A1 | 10/2006 | Gatzen |

(56) References Cited

U.S. PATENT DOCUMENTS

| | | |
|---|---|---|
| 2006/0274452 A1 | 12/2006 | Arya |
| 2006/0274453 A1 | 12/2006 | Arya |
| 2006/0279880 A1 | 12/2006 | Boutaghou et al. |
| 2007/0041123 A1 | 2/2007 | Swanson et al. |
| 2007/0133128 A1 | 6/2007 | Arai |
| 2007/0153430 A1 | 7/2007 | Park et al. |
| 2007/0223146 A1 | 9/2007 | Yao et al. |
| 2007/0227769 A1 | 10/2007 | Brodsky et al. |
| 2007/0253176 A1 | 11/2007 | Ishii et al. |
| 2008/0084638 A1 | 4/2008 | Bonin |
| 2008/0144225 A1 | 6/2008 | Yao et al. |
| 2008/0192384 A1 | 8/2008 | Danielson et al. |
| 2008/0198511 A1 | 8/2008 | Hirano et al. |
| 2008/0247131 A1 | 10/2008 | Hitomi et al. |
| 2008/0273266 A1 | 11/2008 | Pro |
| 2008/0273269 A1 | 11/2008 | Pro |
| 2009/0080117 A1 | 3/2009 | Shimizu et al. |
| 2009/0135523 A1 | 5/2009 | Nishiyama et al. |
| 2009/0147407 A1 | 6/2009 | Huang et al. |
| 2009/0176120 A1 | 7/2009 | Wang |
| 2009/0190263 A1 | 7/2009 | Miura et al. |
| 2009/0244786 A1 | 10/2009 | Hatch |
| 2009/0294740 A1 | 12/2009 | Kurtz et al. |
| 2010/0067151 A1 | 3/2010 | Okaware et al. |
| 2010/0073825 A1 | 3/2010 | Okawara |
| 2010/0097726 A1 | 4/2010 | Greminger et al. |
| 2010/0143743 A1 | 6/2010 | Yamasaki et al. |
| 2010/0165515 A1 | 7/2010 | Ando |
| 2010/0165516 A1 | 7/2010 | Fuchino |
| 2010/0177445 A1 | 7/2010 | Fuchino |
| 2010/0195252 A1 | 8/2010 | Kashima |
| 2010/0208390 A1 | 8/2010 | Hanya et al. |
| 2010/0220414 A1 | 9/2010 | Klarqvist et al. |
| 2010/0246071 A1 | 9/2010 | Nojima et al. |
| 2010/0271735 A1 | 10/2010 | Schreiber |
| 2010/0290158 A1 | 11/2010 | Hanya et al. |
| 2011/0013319 A1 | 1/2011 | Soga et al. |
| 2011/0058282 A1 | 3/2011 | Fujimoto et al. |
| 2011/0096438 A1 | 4/2011 | Takada et al. |
| 2011/0123145 A1 | 5/2011 | Nishio |
| 2011/0141624 A1 | 6/2011 | Fuchino et al. |
| 2011/0228425 A1 | 9/2011 | Liu et al. |
| 2011/0242708 A1 | 10/2011 | Fuchino |
| 2011/0279929 A1 | 11/2011 | Kin |
| 2011/0299197 A1 | 12/2011 | Eguchi |
| 2012/0002329 A1 | 1/2012 | Shum et al. |
| 2012/0113547 A1 | 5/2012 | Sugimoto |
| 2012/0281316 A1 | 11/2012 | Fujimoto et al. |
| 2013/0242434 A1 | 9/2013 | Bjorstrom et al. |
| 2013/0242436 A1 | 9/2013 | Yonekura et al. |
| 2013/0248231 A1 | 9/2013 | Tobias |
| 2013/0265674 A1 | 10/2013 | Fanslau |
| 2014/0022670 A1 | 1/2014 | Takikawa et al. |
| 2014/0022671 A1 | 1/2014 | Takikawa et al. |
| 2014/0022674 A1 | 1/2014 | Takikawa et al. |
| 2014/0022675 A1 | 1/2014 | Hanya et al. |
| 2014/0063660 A1 | 3/2014 | Bjorstrom et al. |
| 2014/0078621 A1 | 3/2014 | Miller et al. |
| 2014/0098440 A1 | 4/2014 | Miller et al. |

FOREIGN PATENT DOCUMENTS

| | | |
|---|---|---|
| JP | 9198825 A | 7/1997 |
| JP | 10003632 A | 1/1998 |
| JP | 2001057039 A | 2/2001 |
| JP | 2001202731 A | 7/2001 |
| JP | 2001307442 A | 11/2001 |
| JP | 2002050140 A | 2/2002 |
| JP | 2002170607 A | 6/2002 |
| JP | 20032223771 A | 8/2003 |
| JP | 2004039056 A | 2/2004 |
| JP | 2004300489 A | 10/2004 |
| JP | 2005209336 A | 8/2005 |
| JP | 2007115864 A | 5/2007 |
| WO | WO 98020485 A1 | 5/1998 |

OTHER PUBLICATIONS

Cheng, Yang-Tse, "Vapor deposited thin gold coatings for high temperature electrical contacts", Electrical Contacts, 1996, Joint with the 18th International Conference on Electrical Contacts, Proceedings of the Forty-Second IEEE Holm Conference, Sep. 16-20, 1996 (abstract only).

Fu, Yao, "Design of a Hybrid Magnetic and Piezoelectric Polymer Microactuator", a thesis submitted to Industrial Research Institute Swinburne (IRIS), Swinburne University of Technology, Hawthorn, Victoria, Australia, Dec. 2005.

Harris, N.R, et al., "A Multilayer Thick-film PZT Actuator for MEMs Applications", Sensors and Actuators A: Physical, vol. 132, No. 1, Nov. 8, 2006, pp. 311-316.

International Search Report and Written Opinion issued in PCT/US2013/031484, mailed May 30, 2013, 13 pages.

International Search Report and Written Opinion issued in PCT/US2013/033341, mailed Jun. 14, 2013, 9 pages.

International Search Report and Written Opinion issued in PCT/US2013/052885, mailed Feb. 7, 2014, 13 pages.

International Search Report and Written Opinion issued in PCT/US2013/064314, dated Apr. 18, 2014, 10 pages.

Jing, Yang, "Fabrication of piezoelectric ceramic micro-actuator and its reliability for hard disk drives", Ultrasonics, Ferroelectrics and Frequency Control, IEEE, vol. 51, No. 11, Nov. 2004, pp. 1470-1476 (abstract only).

Kon, Stanley et al., "Piezoresistive and Piezoelectric MEMS Strain Sensors for Vibration Detection", Sensors and Smart Structures Technologies for Civil, Mechanical, and Aerospace Systems 2007: Proc. of SPIE vol. 6529

Lengert, David et al., "Design of suspension-based and collocated dual stage actuated suspensions", Microsyst Technol (2012) 18:1615-1622.

Li, Longqiu et al., "An experimental study of the dimple-gimbal interface in a hard disk drive", Microsyst Technol (2011) 17:863-868.

Pichonat, Tristan et al., "Recent developments in MEMS-based miniature fuel cells", Microsyst Technol (2007) 13:1671-1678.

Raeymaekers B. et al., "Investigation of fretting wear at the dimple/gimbal interface in a hard disk drive suspension", Wear, vol. 268, Issues 11-12, May 12, 2010, pp. 1347-1353.

Raeymaekers, Bart et al., "Fretting Wear Between a Hollow Sphere and Flat Surface", Proceedings of the STLE/ASME International Joint Tribology Conference, Oct. 19-21, 2009, Memphis, TN USA, 4 pages.

Rajagopal, Indira et al., "Gold Plating of Critical Components for Space Applications: Challenges and Solutions", Gold Bull., 1992, 25(2), pp. 55-66.

U.S. Appl. No. 13/365,443 to Miller, Mark A., entitled Elongated Trace Tethers for Disk Drive Head Suspension Flexures, filed Feb. 3, 2012.

U.S. Appl. No. 13/690,883 to Tobias, Kyle T. et al., entitled Microstructure Patterned Surfaces for Integrated Lead Head Suspensions, filed Nov. 30, 2012.

U.S Appl. No. 13/827,622 to Bjorstrom, Jacob D. et al., entitled Mid-Loadbeam Dual Stage Actuated (DSA) Disk Drive Head Suspension, filed Mar. 14, 2013.

U.S. Appl. No. 14/056,481 entitled Two-Motor Co-Located Gimbal-Based Dual Stage Actuation Disk Drive Suspensions With Motor Stiffeners, filed Oct. 17, 2013.

U.S. Appl. No. 14/103,955 to Bjorstrom. Jacob D. et al., entitled Electrical Contacts to Motors in Dual Stage Actuated Suspensions, filed Dec. 12, 2013.

U.S. Appl. No. 14/141,617 to Bennin, Jeffry S. et al., entitled Disk Drive Suspension Assembly Having a Partially Flangeless Load Point Dimple, filed Dec. 27, 2013, 53 pages.

U.S. Appl. No. 14/145,515 to Miller, Mark A. et al., entitled Balanced Co-Located Gimbal-Based Dual Stage Actuation Disk Drive Suspensions, filed Dec. 31, 2013, 39 pages.

(56) References Cited

OTHER PUBLICATIONS

U.S. Appl. No. 14/216,288 to Miller, Mark A. et al., entitled Co-Located Gimbal-Based Dual Stage Actuation Disk Drive Suspension, filed Mar. 17, 2014, 84 pages.
U.S. Appl. No. 61/396,239 entitled Low Resistance Ground Joints for Dual Stage Actuation Disk Drive Suspensions, filed May 24, 2010, 16 pages.
U.S. Appl. No. 13/114,212, filed May 24, 2011, (23 pages).
U.S. Appl. No. 61/336,239, filed May 24, 2010, (16 pages).
U.S. Appl. No. 13/955,204 to Bjorstrom, Jacob D. et al., entitled Damped Dual Stage Actuation Disk Drive Suspensions, filed Jul. 31, 2013.
U.S. Appl. No. 13/972,137 to Bjorstrom, Jacob D. et al., entitled Co-Located Gimbal-Based Dual Stage Actuation Disk Drive Suspensions With Offset Motors, filed Aug. 21, 2013.
U.S. Appl. No. 14/026,427 to Miller, Mark A., entitled Co-Located Gimbal-Based Dual Stage Actuation Disk Drive Suspensions, filed Sep. 13, 2013.
U.S. Appl. No. 14/044,238 to Miller, Mark A., entitled Co-Located Gimbal-Based Dual Stage Actuation Disk Drive Suspensions With Motor Stifeners, filed Oct. 2, 2013.
U.S. Appl. No. 14/050,660 to Miller, Mark A. et al., entitled Co-Located Gimbal-Based Dual Stage Actuation Disk Drive Suspensions With Dampers, filed Oct. 10, 2013.
Yoon, Wonseok et al., "Evaluation of coated metallic bipolar plates for polymer electrolyte membrane fuel cells". The Journal of Power Sources, vol. 179, No. 1. Apr. 15, 2008, pp. 265-273.

LOW RESISTANCE GROUND JOINTS FOR DUAL STAGE ACTUATION DISK DRIVE SUSPENSIONS

CROSS-REFERENCE TO RELATED APPLICATIONS

This application is a continuation of U.S. patent application Ser. No. 13/114,212 , filed May 24, 2011, now U.S. Pat. No. 8,885,299, issued Nov. 11, 2014, which claims the benefit under 35 U.S.C. 119 of Provisional Application No. 61/396,239 , filed May 24, 2010 , which are incorporated herein by reference in their entirety for all purposes.

TECHNICAL FIELD

The present invention relates to suspensions for disk drives. In particular, the invention is a dual stage actuation (DSA) suspension and method of manufacture.

BACKGROUND OF THE INVENTION

Figures 1A, 1B:
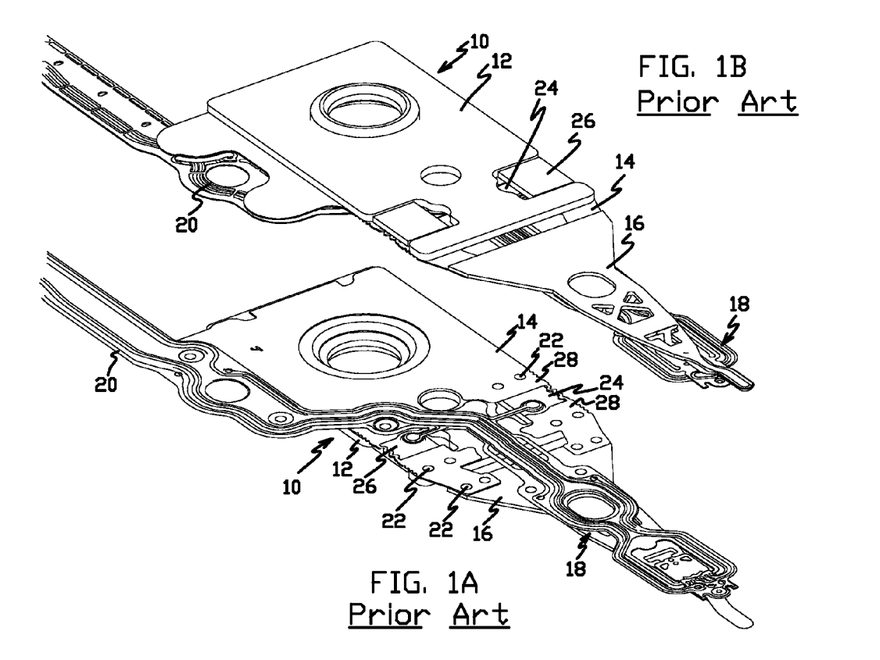

Dual stage actuation (DSA) disk drive head suspensions are generally known and commercially available. By way of example, one embodiment of a DSA head suspension 10 is shown in FIGS. 1A and 1B. The illustrated DSA suspension includes a baseplate 12, hinge 14 or spring region, load beam 16 and integrated lead flexure 18 with traces 20. The hinge 14 is mounted to the baseplate 12 and extends from the distal end of the baseplate. The load beam is mounted to the distal end of the hinge 14. The flexure 18 is mounted to the load beam 16, typically on the side of the load beam mounted to the hinge 14. Welds such as 22 are typically used to join these components. The baseplate 12, hinge 14 and load beam 16 are typically formed from stainless steel, and the flexure 18 typically includes a base layer of stainless steel. The copper or copper alloy traces 20 on the flexure 18 are separated from the stainless steel base layer by a layer of polyimide or other insulator.

The second stage actuation functionality of the illustrated DSA suspension 10 is incorporated into the baseplate 12. As shown, the baseplate 12 has one or more motor-receiving areas or openings 24 (two in the illustrated embodiment). Piezoelectric (PZT) motors 26 are mounted to the baseplate 12 in the motor-receiving openings 24. The motors 26 are mounted to tabs 28 extending from the baseplate 12 into the motor-receiving openings 24. In the illustrated suspension 10 the tabs 28 are portions of the hinge 14. In other embodiments (not shown) the tabs 28 to which the PZT motors 26 are mounted can be other components such as a separate motor plate welded to the baseplate. Epoxy or other adhesive is typically used to mount the motors 26 to the tabs 28.

DSA suspensions can be embodied in still other forms. For example, an alternative DSA suspension structure is illustrated and described in the Okawara U.S. Patent Publication No. 2010/0067151 which is incorporated herein by reference in its entirety and for all purposes. Briefly, the suspension shown in the Okawara publication has an actuator plate to which the motors are mounted. The actuator plate is mounted between the baseplate and hinge. In still other DSA suspensions (not shown), the motors can be mounted to the load beam or hinge.

An electrical connection or conductive joint between an electrical ground contact on a face of the motor and the ground plane of the suspension is typically made by conductive adhesive (e.g., epoxy with silver and/or nickel particles). The ground contacts on the motors typically have an external plated gold (Au) layer. These connections are typically formed by applying a mass of the conductive adhesive at a location where the ground contact of the motor is adjacent to a stainless steel portion of the baseplate, load beam, hinge or flexure. The conductive adhesive contacts both the motor ground contact and the stainless steel portion of the suspension, thereby providing an electrical connection or ground joint from the motor to the stainless steel portions of the suspension that function as the ground plane.

The conductive joint between the motor and the ground plane should be capable of functioning at or below a threshold level of acceptable resistance under all applied processing and operational load conditions. However, consistently maintaining acceptable resistance to ground levels has been difficult. In particular, the resistance of the conductive adhesive-to-stainless steel component joints have been determined to be relatively high and unstable.

SUMMARY OF THE INVENTION

A dual stage actuation (DSA) suspension in accordance with the invention has a stable, low resistance conductive adhesive electrical connection between an electrical contact on a motor and a plated contact area on a stainless steel component of the suspension. The contact area on the suspension component is plated with conductive and generally non-corrosive metal or metal alloy such as gold or nickel gold. In one embodiment, the stainless steel component includes a stainless steel layer of a flexure and the suspension includes a baseplate having a through hole. The conductive adhesive connection extends from the motor, across a portion of the baseplate, into the though hole of the baseplate and into contact with the plated contact area on the stainless steel layer of the flexure.

BRIEF DESCRIPTION OF THE DRAWINGS

FIG. 1 A is an isometric illustration of the flexure side of a prior art dual stage actuation (DSA) suspension.

FIG. 1B is an isometric illustration of the opposite, baseplate side of the prior art suspension shown in FIG. 1A.

DETAILED DESCRIPTION

Overview

The invention is a dual stage actuation (DSA) suspension having a stable, low resistance conductive adhesive electrical connection or joint between an electrical contact on a motor of the suspension and a plated metal contact area on a stainless steel component of the suspension. One embodiment of the invention includes a ground joint between the electrical contact of a piezoelectric (PZT) motor and a gold or nickel gold plated contact area on the stainless steel suspension component. The gold or nickel gold or other conductive and generally non-corrosive metal or alloy plated area on the stainless steel suspension component is referred to generally in the description of the invention below as the plated region. In still other embodiments a layer of nickel is plated on the stainless steel, and a gold layer is plated on the nickel layer.

As described below in connection with the attached drawing figures, the invention can be embodied in a number of different structures. For example, the invention can be embodied in DSA suspensions such as that described above in connection with FIGS. 1A and 1B. Alternatively, the invention can be embodied in DSA suspension structures of the type disclosed in the Okawara U.S. Patent Publication No. 2010/0067151. For example, the stainless steel suspension component to which the ground joint is made can be a baseplate, load beam, hinge, motor plate, flexure or other component. The plated contact area on the stainless steel suspension component can be heat treat annealed. In some embodiments of the invention, the plated contact surface retains a full surface coverage of the plated alloy. In other embodiments of the invention the plated contact surface includes approximately 98% stainless steel and 2% gold following the heat treat and annealing process. In yet other embodiments, the plated contact surface includes about 90% stainless steel surface and about 10% gold. Only the portion of the component to which the conductive adhesive ground joint is being made need be plated (e.g., patterned and selectively plated), although in other embodiments larger areas or even the entire component surface can be plated.

The invention provides a reliable, stable and low resistance joint between the conductive adhesive and the plated stainless steel contact area. The desired resistance level can vary with the application of the suspension (e.g., with the drive circuitry that the motor is to be connected). One example specification calls for ground contact resistance levels no greater than 2500 ohms. Another specification calls for resistance levels no greater than 100 ohms. Still other embodiments of the invention have a resistance no greater than 10 ohms and even less than 1 ohm over the life of the suspension.

Plated Flexure Embodiments

Figure 2:
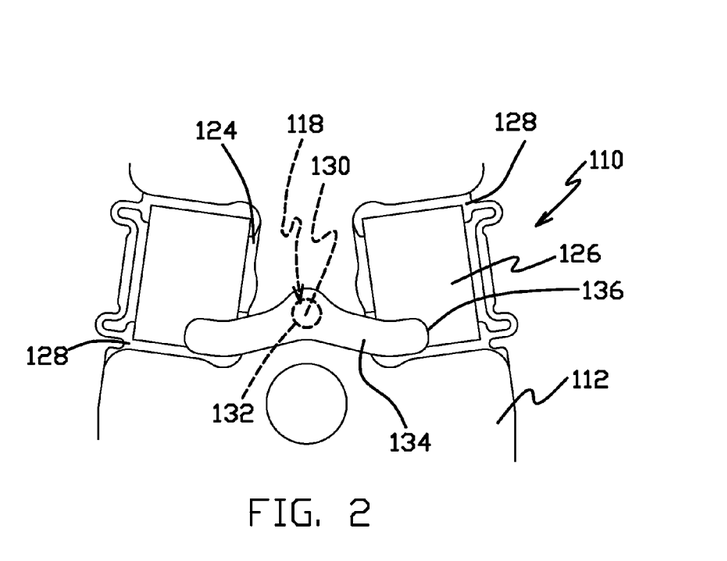
FIG. 2 is a plan view illustration of a portion of a DSA suspension in accordance with an embodiment of the invention having a plated flexure.
Figure 3:
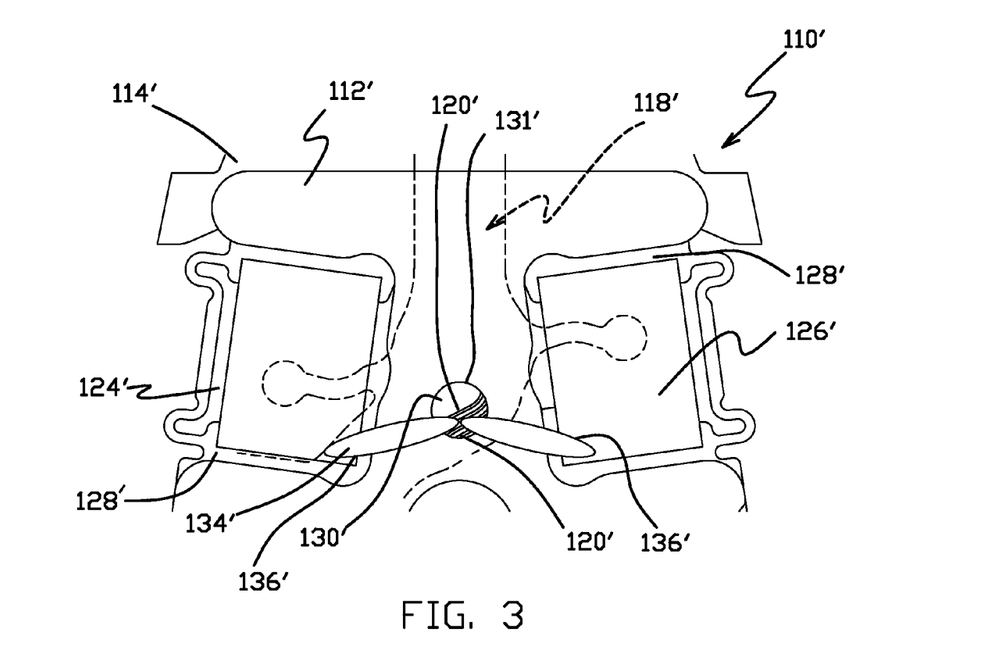
FIG. 3 is a plan view illustration of an alternative embodiment of the suspension shown in FIG. 2.

FIGS. 2 illustrates portions of a suspension 110 in accordance with an embodiment of the invention having a through hole or opening 130 in the baseplate 112 that exposes a gold plated contact 132 on the flexure 118. Features of the suspension 110 that are similar to those of suspension 10 described above in connection with FIGS. 1A and 1B are identified by similar reference numbers in the "100" series. Conductive adhesive 134 extends from the motor contact 136, over the baseplate 112, into and through the baseplate opening 130, and to the plated flexure contact 132. The plated contact 132 on the flexure 118 can be a contact plated directly onto the stainless steel base layer of the flexure 118. In an alternative embodiment shown in FIG. 3 illustrating portions of suspension 110' a through hole 131' is etched or otherwise formed through the stainless steel base layer of the flexure 118' to expose a plated portion of a trace 120' on the flexure. In this alternative embodiment the conductive adhesive 134' extend through the holes 130' and 131' in the baseplate 112' and the flexure 118', and contacts the plated flexure trace 120'.

Figure 4:
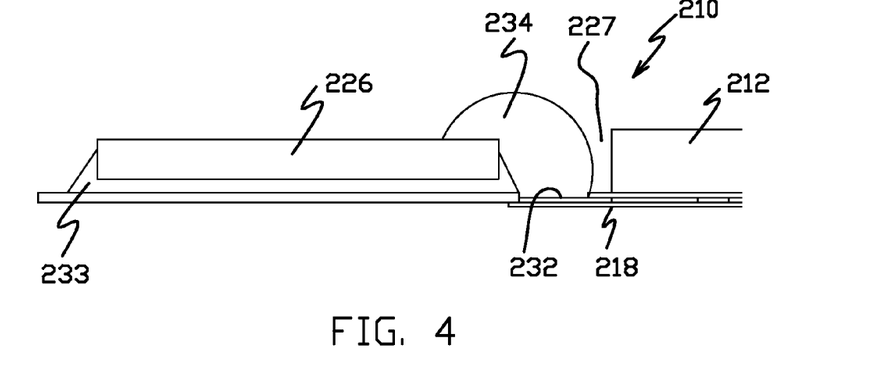
FIG. 4 is a side view illustration of a portion of a DSA suspension in accordance with another embodiment of the invention having a plated flexure.
Figure 5:
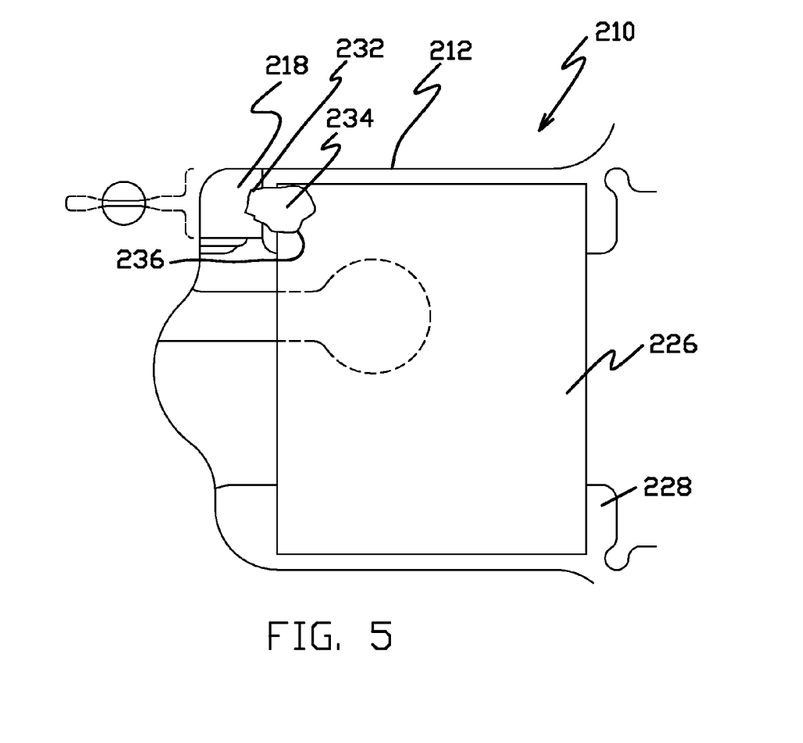
FIG. 5 is a plan view illustration of the suspension shown in FIG. 4.

FIGS. 4 and 5 illustrate portions of a suspension 210 in accordance with another embodiment of the invention. Features of the suspension 210 that are similar to those of suspension 10 described above in connection with FIGS. 1A and 1B are identified by similar reference numbers in the "200" series. In this embodiment the mass of conductive adhesive 234 extends from the motor contact 236, over the edge of the motor 226, into a gap 227 between the motor and baseplate 212, and into contact with the plated contact region 232 on the flexure 218. As with the embodiment shown in FIGS. 2 and 3, the plated contact 232 on the flexure 218 can be on the stainless steel base layer or on a trace exposed at a through hole (not shown) in the flexure. Non-conductive adhesive 233 is used to mount the motor 226 to the hinge tabs 228 and isolate the second (bottom) electrode of the motor from the conductive adhesive 234 of the ground joint.

Formed Flexure Embodiments

Figure 6:
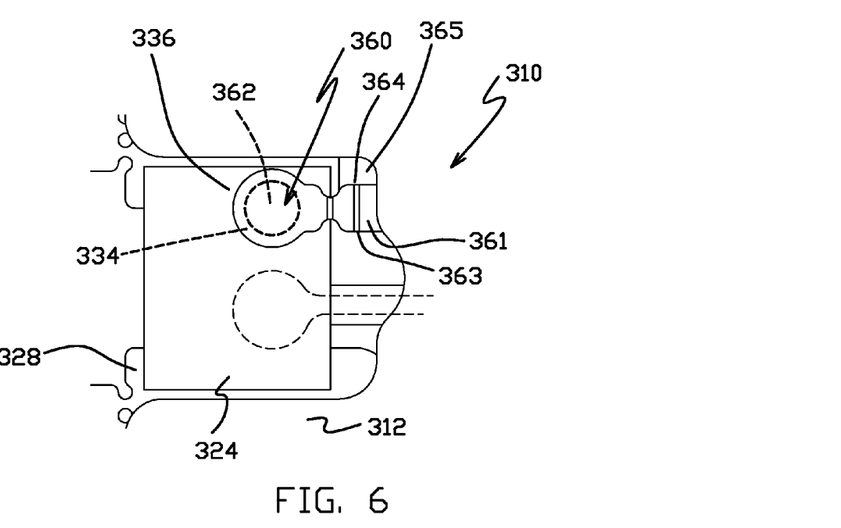
FIG. 6 is a plan view illustration of a portion of a DSA suspension in accordance with another embodiment of the invention having a formed flexure tab.
Figure 7:
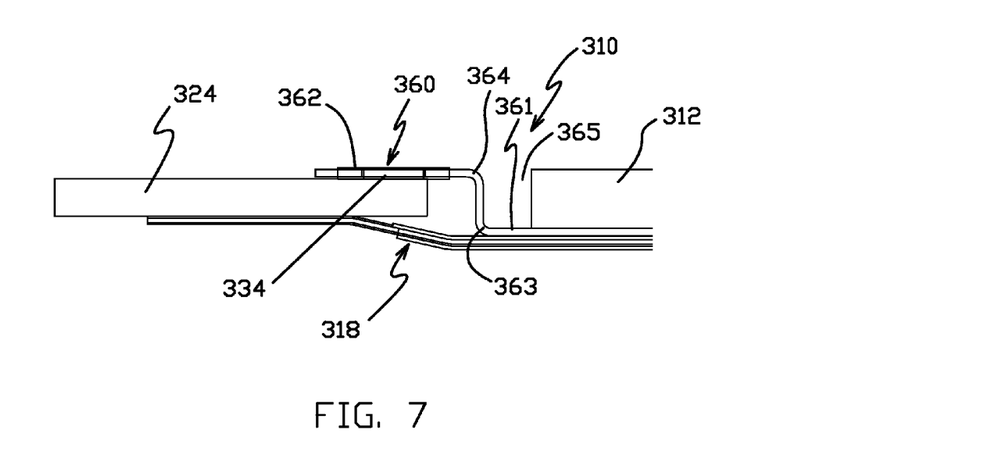
FIG. 7 is a side view illustration of the suspension shown in FIG. 6.

FIGS. 6 and 7 illustrate portions of a suspension 310 in accordance with another embodiment of the invention having a flexure 318 with a tab 360 or paddle on the stainless steel base layer 361 that has a plated contact 362. Features of the suspension 310 that are similar to those of suspension 10 described above in connection with FIGS. 1A and 1B are identified by similar reference numbers in the "300" series. The flexure tab 360 is formed (e.g., two 90° bends 363, 364 are shown) to extend out of the plane of the other portions of the flexure 318, through a gap 365 between the baseplate 312 and motor 324, and into contact with the ground contact 336 on the motor. A mass of conductive adhesive 334 joins the plated contact 362 on the formed flexure tab 360 to the motor ground contact 336.

Plated Hinge Embodiments

Figure 8:
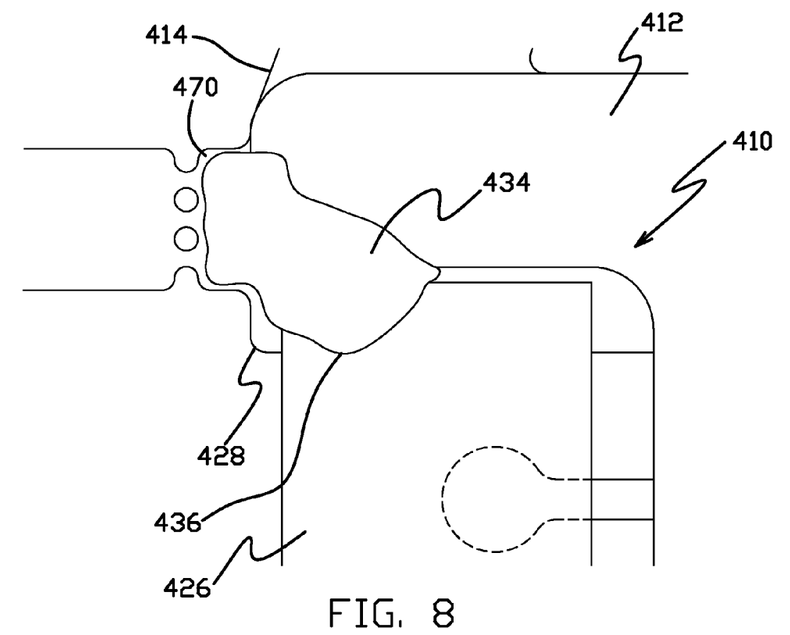
FIGS. 8 and 9 are plan view illustrations of portions of a DSA suspension in accordance with another embodiment of the invention having a plated hinge.
Figure 9:
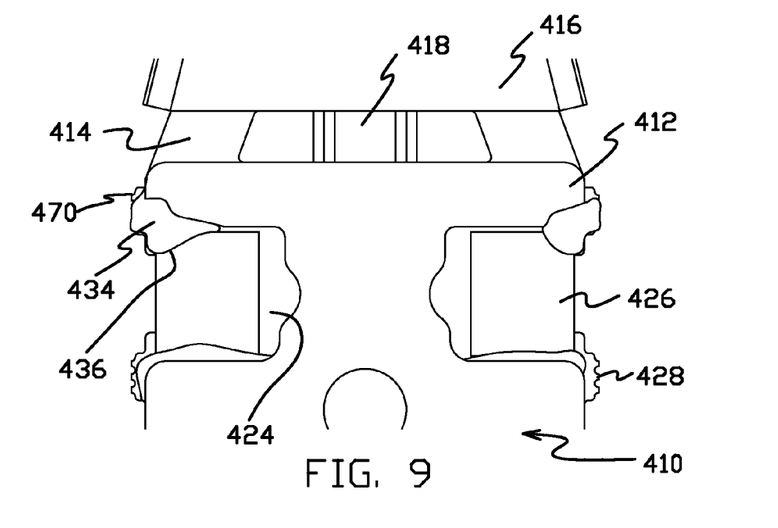

FIGS. 8 and 9 illustrate portions of a suspension 410 in accordance with another embodiment of the invention having a plated contact 470 on a portion of the hinge near or adjacent to the motor 426 (e.g., the hinge motor tab). FIG. 9 shows the suspension 410 after a de-tabbing step relative to FIG. 8. Features of the suspension 410 that are similar to those of suspension 10 described above in connection with FIGS. 1A and 1B are identified by similar reference numbers in the "400" series. The conductive adhesive 434 extends from the motor contact 436 over the edge of the motor 426 and into contact with the plated contact 470 on the hinge 414. In the illustrated embodiments the conductive adhesive 434 also extends over a portion of the baseplate 412 and the edge of the baseplate.

Figure 10:
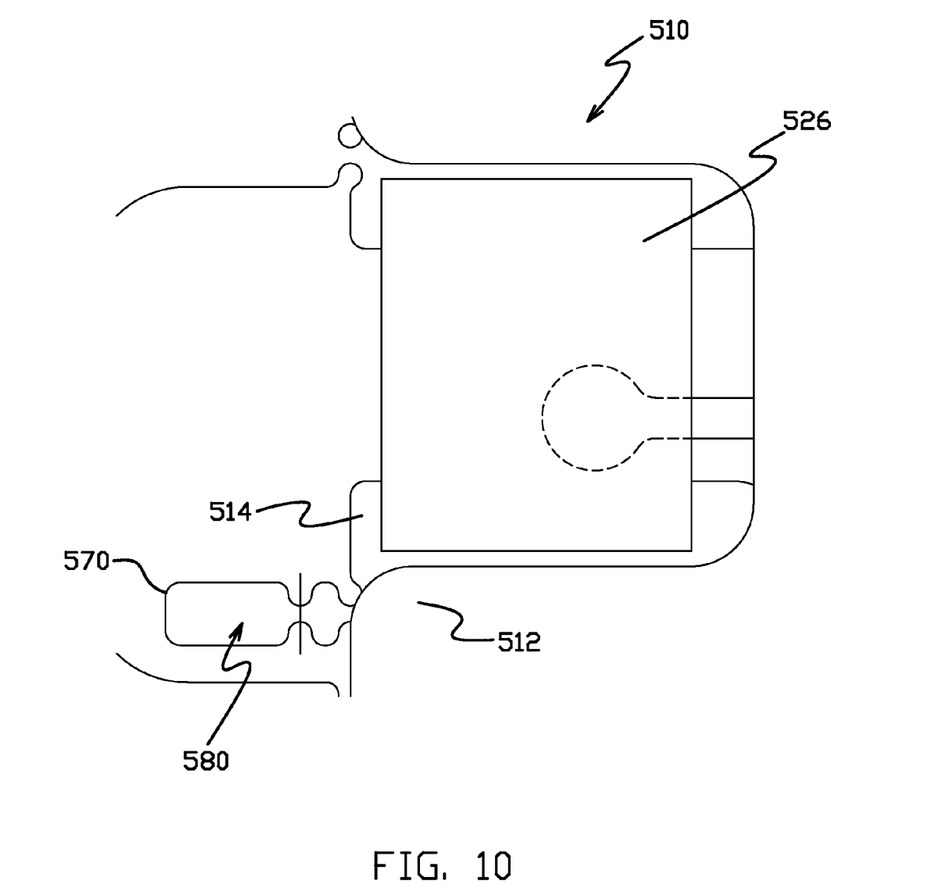
FIGS. 10 and 11 are plan view illustrations of portions of a DSA suspension in accordance with another embodiment of the invention having a plated hinge having a tab. The tab is shown unformed in FIG. 10 and formed in FIG. 11.
Figure 11:
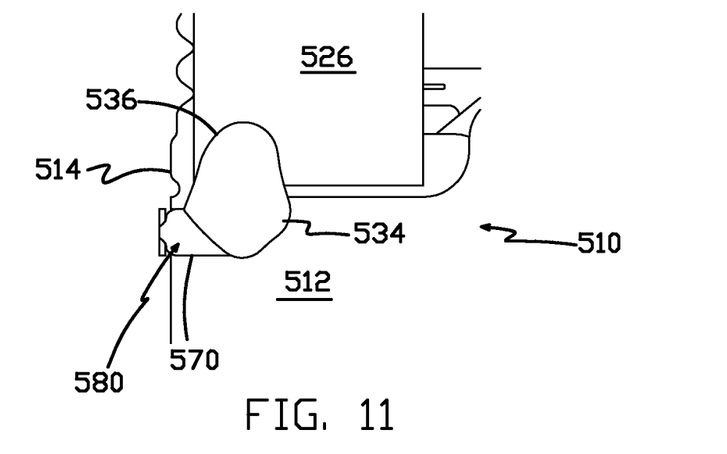
Figure 12:
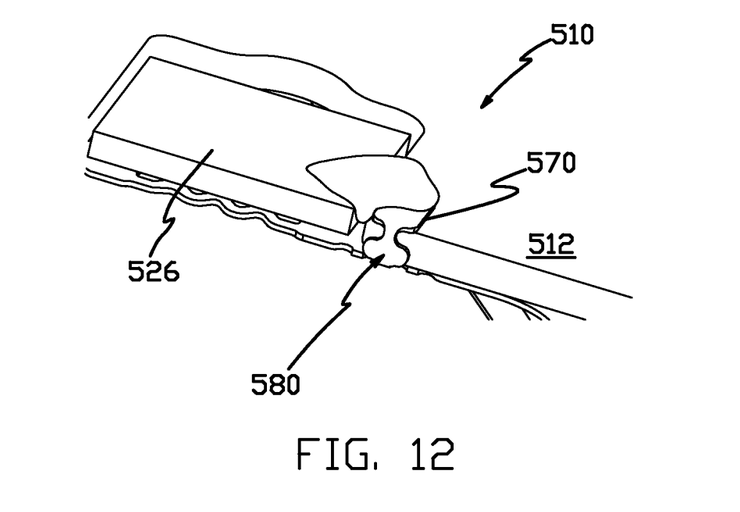
FIG. 12 is an isometric illustration of the suspension shown in FIG. 11.

FIGS. 10-12 illustrate portions of suspension 510 in accordance with another embodiment of the invention having a formed plated hinge 514. Features of the suspension 510 that are similar to those of suspension 10 described above in connection with FIGS. 1A and 1B are identified by similar reference numbers in the "500" series. A plated contact 570 is formed on a tab 580 extending from the hinge 514. The tab 580 is shown in an unformed state in FIG. 10. During suspension 510 assembly the tab 580 is formed to extend up the edge and over the baseplate 512 at a location adjacent to the motor 526. The conductive adhesive 534 extends between the motor ground contact 536 and the plated contact 570 on the formed tab 580, across the baseplate 512.

Add-On Feature Embodiments

Figure 13:
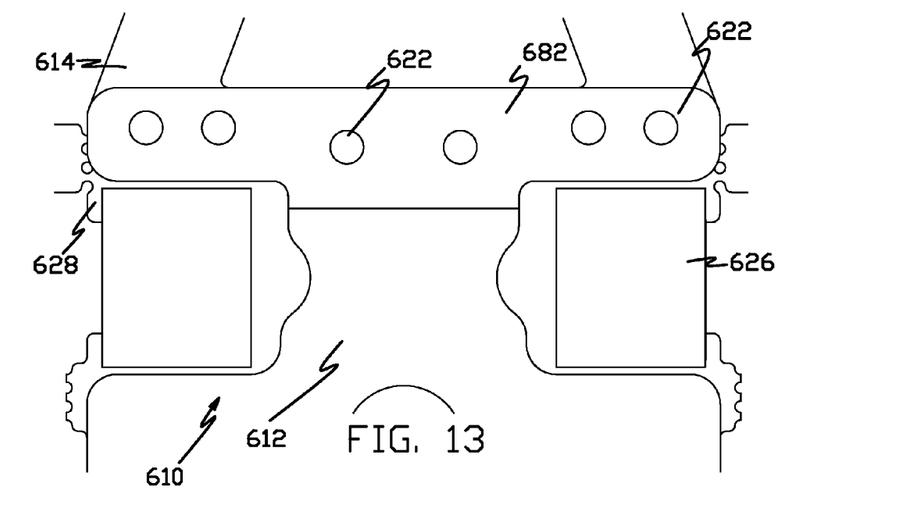
FIGS. 13 and 14 are plan view illustrations of portions of a DSA suspension in accordance with another embodiment of the invention having a plated add-on feature.
Figure 14:
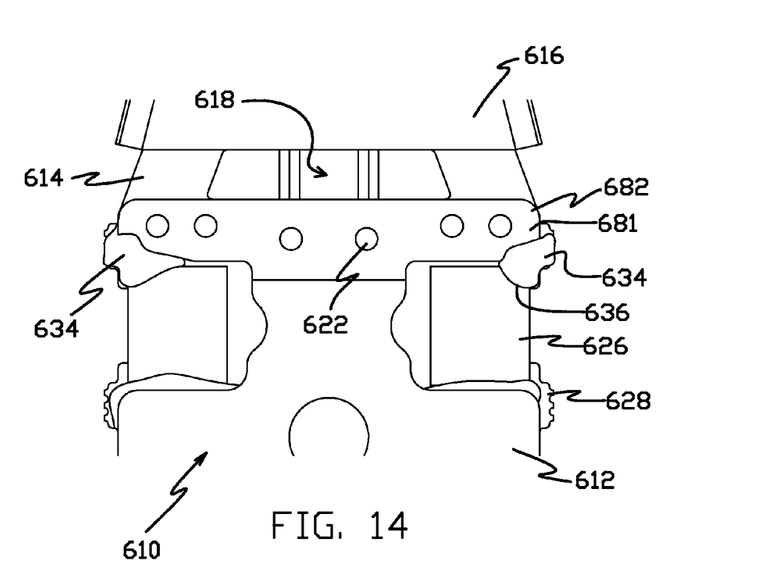

FIGS. 13 and 14 illustrate portions of a suspension 610 in accordance with another embodiment of the invention including a separately manufactured plated element or feature 682 that is welded (e.g., by welds 622) or otherwise attached to the baseplate 612 adjacent to the motors 626. The conductive adhesive 634 extends from the motor contact pad 636 to the plated surface 681 of the feature 682, over the edge of the feature. FIG. 14 shows the suspension 610 after a de-tabbing step and application of conductive adhesive 634 relative to FIG. 13.

Plated Baseplate Embodiments

Figure 15:
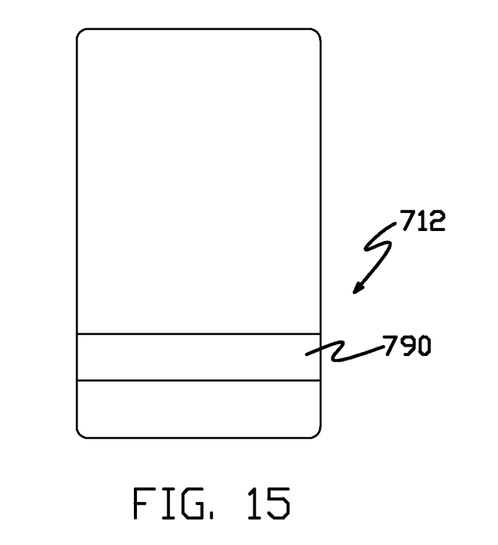
FIG. 15 is a plan view illustration of a plated unformed baseplate in accordance with another embodiment of the invention.
Figure 16:
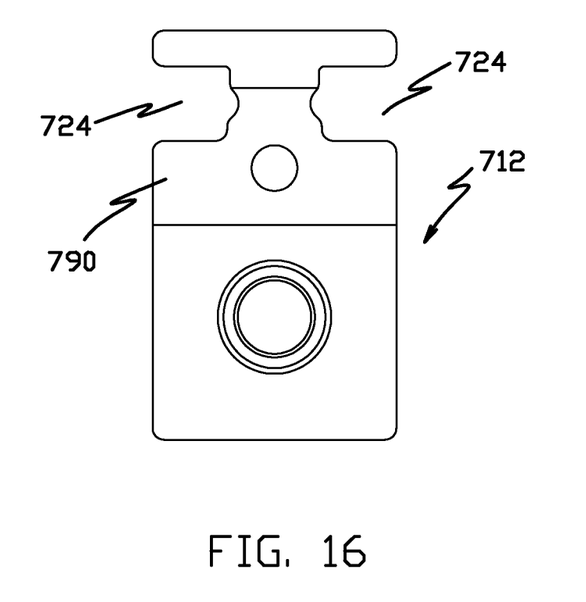
FIG. 16 is a plan view illustration of the plated baseplate in FIG. 15 in the formed state.

FIGS. 15 and 16 illustrate plated baseplates 712 in accordance with another embodiment of the invention. A plated stripe 790 is formed on the baseplate stock. FIG. 15 shows the baseplate 712 unformed. The stock is formed with the plated stripe 790 located adjacent to the motor openings 724 as shown in FIG. 16. The mass of conductive adhesive (not shown) will extend between the motor contact (not shown) and the plated portion 790 of the baseplate 712.

Plated Plug Baseplate

Figure 17:
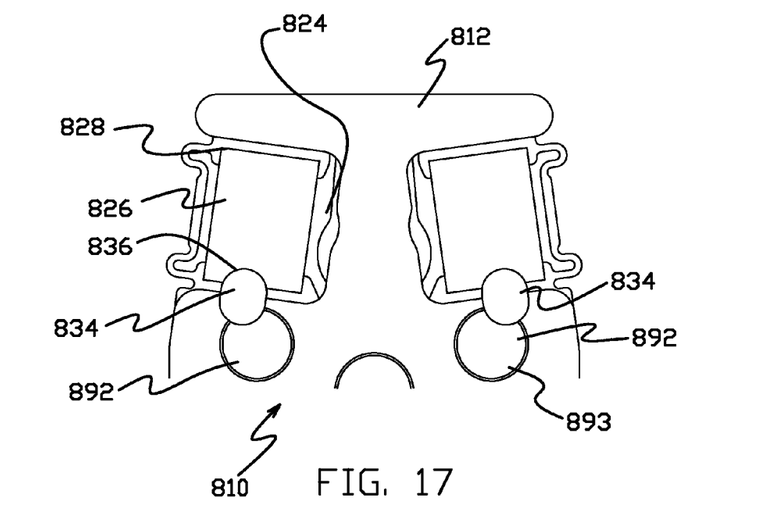
FIG. 17 is a plan view illustration of a portion of a DSA suspension in accordance with an embodiment of the invention having a plated plug.
Figure 18:
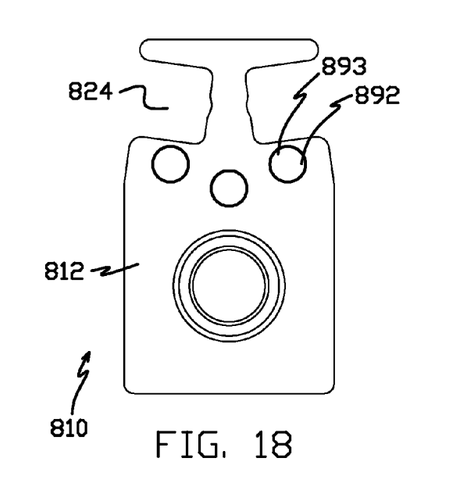
FIG. 18 is a plan view illustration of the baseplate and plated plug components of the suspension shown in FIG. 17.
Figure 19:
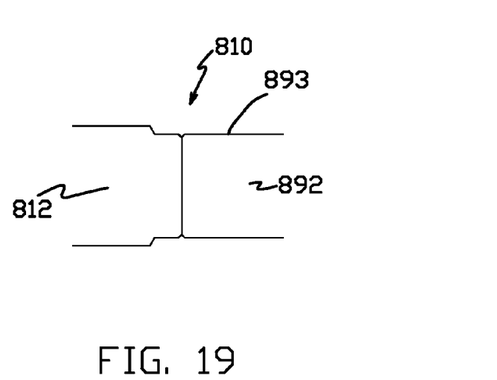
FIG. 19 is a cross section side view illustration of the assembled baseplate and plated plug components shown in FIGS. 17 and 18.

FIGS. 17-19 illustrate portions of a suspension 810 in accordance with another embodiment of the invention including plated stainless steel plugs 892 in the baseplate 812. Features of the suspension 810 that are similar to those of suspension 10 described above in connection with FIGS. 1A and 1B are identified by similar reference numbers in the "800" series. The plated plugs 892 can be manufactured separately from the baseplate 812, and mechanically forced into holes in the baseplate with the plated surface 893 oriented toward the same side of the baseplate as the motor contacts 836. The plug 892 can be press fit, coined or otherwise forced into the hole in the baseplate 812 to form a substantial and secure mechanical, and low resistance contact between the plug and baseplate. Coining provides the additional adavantage of leaving a depression that can be useful in adhesive wicking control. FIG. 19 is a cross section view of an assembled baseplate 812 and plated plug 892. The conductive adhesive 834 is applied so that it extends between the plated surface 893 of the plug 892 and the motor ground contact 836.

Although the invention is described with reference to a number of different embodiments, those skilled in the art will recognize that changes can be made in form and detail without departing from the spirit and scope of the invention.

The following is claimed:

1. A dual stage actuation suspension, including:
a flexure, the flexure having a stainless steel base layer, a trace layer, a through hole, and a plated contact, the plated contact comprising a non-corrosive metal or metal alloy plated on the trace layer, the plated contact exposed through the through hole in the flexure;
a motor having an electrical contact; and
a conductive adhesive joint extending from the electrical contact to the plated contact to electrically connect the electrical contact with the trace layer.

2. The suspension of claim 1, wherein the through hole extends through the stainless steel base layer.

3. The suspension of claim 2, wherein the conductive adhesive extends though the through hole to connect to the plated contact.

4. The suspension of claim 1, wherein the trace layer is formed by copper or copper alloy.

5. The suspension of claim 1, wherein the trace layer is separated from the stainless steel base layer by a layer of polyimide.

6. The suspension of claim 1, wherein the conductive adhesive extends from the electrical contact, over an edge of the motor, and into contact with the plated contact.

7. The suspension of claim 1, further comprising a base plate, wherein the conductive adhesive extends from the electrical contact, over an edge of the motor, into a gap between the motor and a baseplate, and into contact with the plated contact.

8. The suspension of claim 1, further comprising a non-conductive adhesive onto which the motor is mounted to isolate a second electrode, located on the bottom of the motor, from the conductive adhesive.

9. The suspension of claim 1, wherein the non-corrosive metal or metal alloy is gold.

10. The suspension of claim 1, wherein the non-corrosive metal or metal alloy is a gold alloy.

11. The suspension of claim 1, wherein the trace layer includes a plurality of traces that extend along the flexure.

12. The suspension of claim 11, wherein the plated contact is on the plurality of traces.

13. A dual stage actuation suspension, including:
a flexure, the flexure having a stainless steel base layer, a trace layer, and a plated contact, the plated contact comprising a non-corrosive metal or metal alloy plated on the trace layer, the trace layer exposed through an opening in the flexure;
a motor having an electrical contact; and
a conductive adhesive joint, the conductive adhesive extending from the electrical contact, over an edge of the motor, through the opening, and into contact with the plated contact to electrically connect the electrical contact with the trace layer.

14. The suspension of claim 13, wherein the opening is in the stainless steel base layer.

15. The suspension of claim 13, wherein the trace layer is formed by copper or copper alloy.

16. The suspension of claim 15, wherein the trace layer includes a plurality of traces and the plated contact is on the plurality of traces.

17. The suspension of claim 13, further comprising a base plate, wherein the conductive adhesive extends from the electrical contact, over the edge of the motor, into a gap between the motor and a baseplate.

18. The suspension of claim 13, wherein the opening is a through hole.

19. The suspension of claim 13, further comprising a non-conductive adhesive onto which the motor is mounted to isolate a second electrode, located on the bottom of the motor, from the conductive adhesive.

20. The suspension of claim 13, wherein the non-corrosive metal or metal alloy is gold or a gold alloy.

* * * * *